United States Patent [19]

Bertram

[11] 4,162,244

[45] Jul. 24, 1979

[54] COATING COMPOSITIONS

[75] Inventor: James L. Bertram, Lake Jackson, Tex.

[73] Assignee: The Dow Chemical Company, Midland, Mich.

[21] Appl. No.: 937,022

[22] Filed: Aug. 25, 1978

[51] Int. Cl.$^2$ .............................................. C09D 3/58
[52] U.S. Cl. ...................... 260/37 EP; 260/33.2 EP; 260/37 M; 428/418; 528/111; 528/121; 528/407
[58] Field of Search ................... 260/33.2 EP, 37 EP, 260/37 M; 428/418; 528/111, 121, 407

[56] References Cited

U.S. PATENT DOCUMENTS

| | | | |
|---|---|---|---|
| 3,110,691 | 11/1963 | Fisher | 260/22 |
| 3,317,471 | 5/1967 | Johnson et al. | 260/47 |
| 3,350,325 | 10/1967 | Ashby et al. | 260/2 |
| 3,671,331 | 6/1972 | Melkin et al. | 143/6.2 |
| 3,819,425 | 6/1974 | De Ridder et al. | 148/6.16 |
| 3,849,141 | 11/1974 | Palm et al. | 106/1 |
| 3,884,705 | 5/1975 | Blair | 106/1 |
| 3,907,608 | 9/1975 | Barrett et al. | 148/6.2 |
| 3,970,482 | 7/1976 | Gunn | 148/6.2 |
| 3,990,920 | 11/1976 | De Ridder et al. | 148/6.2 |
| 4,020,220 | 4/1977 | Germano | 428/472 |
| 4,049,600 | 9/1977 | Patel | 260/22 EP |

OTHER PUBLICATIONS

Kennedy, "Zincrometal: Coil Coating's Answer to Corrosion", *Modern Paint and Coatings*, pp. 21-26 (Sep. 1976).

*Primary Examiner*—Earl A. Nielsen
*Attorney, Agent, or Firm*—J. G. Carter

[57] ABSTRACT

Weldable coatings containing, an electro-conductive pigment such as zinc, an epoxy resin binder and solvent are improved by employing as the epoxy resin binder, the reaction product of a relatively low molecular weight epoxy resin such as the diglycidyl ether of bisphenol A and an amine compound having two amine hydrogen atoms such as ethanolamine.

5 Claims, No Drawings

COATING COMPOSITIONS

BACKGROUND OF THE INVENTION

The automotive industry employs steel having coatings which are substantially corrosion resistant and which withstand the stress and stretching of sheet metal stamping and forming operations. Coatings currently in use include a base coat of a proprietary composition containing zinc and chromic acid and a top coating of a linear high molecular weight epoxy resin or phenoxy resin containing zinc. Such is well described in an article by Dr. Alexander W. Kennedy entitled "ZINCROMETAL:COIL COATINGS ANSWER TO CORROSION" published in *MODERN PAINT AND COATINGS*, Sept. 1976, pages 21–26.

These high molecular weight epoxy or phenoxy resins employed as the binder in such coatings have weight average molecular weights of about 30,000 and above. The coatings of the present invention are equal to or superior to these binders in the double draw test while having weight average molecular weights much less e.g. less than about 10,000.

The present invention is directed to an improvement in a weldable coating composition comprising an electrically conductive pigment, an epoxy resin binder and solvent wherein the improvement resides in employing as the resin binder, the reaction product of (1)

an epoxy resin having an average of more than one vicinal epoxy group per molecule which is a polyglycidyl ether of a polyhydroxyl-containing compound or mixture of such epoxy resins wherein said epoxy resins have an epoxide equivalent weight of less than about 250, preferably less than about 200 and that when said epoxy resin contains aromatic, or cycloaliphatic groups substituted with halogen atoms said equivalent weight is calculated on the basis of the halogen atoms being hydrogen atoms; with (2)

(a) from about 90 to about 100, preferably from about 95 to about 100 equivalent percent of a compound having only two amine hydrogen atoms and (b) from about 0 to about 10, preferably from about 0 to about 5 equivalent percent of a compound having only one amine hydrogen; and wherein the epoxy:amine hydrogen equivalent ratio is from about 0.90:1 to about 1.1:1, preferably from about 0.95:1 to about 1.03:1.

DESCRIPTION OF THE PREFERRED EMBODIMENTS

Suitable epoxy resins which can be employed herein include the glycidyl ethers of polyhydroxyl-containing compounds having less than 3 hydroxyl groups, preferably dihydroxyl-containing compounds, such as, for example, resorcinol, catechol, hydroquinone, bisphenols, polyoxyalkylene glycols, novolac resins, mixtures thereof and the like.

Particularly suitable are those glycidyl ethers represented by the following formulas.

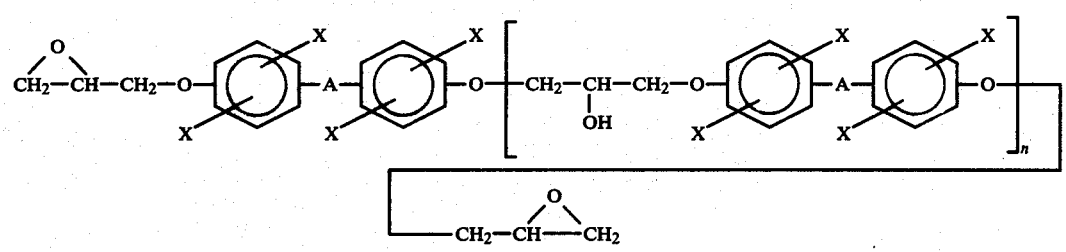

(I)

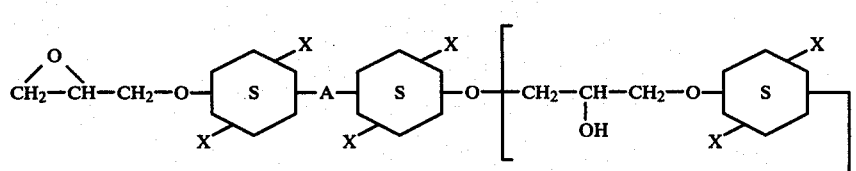

(II)

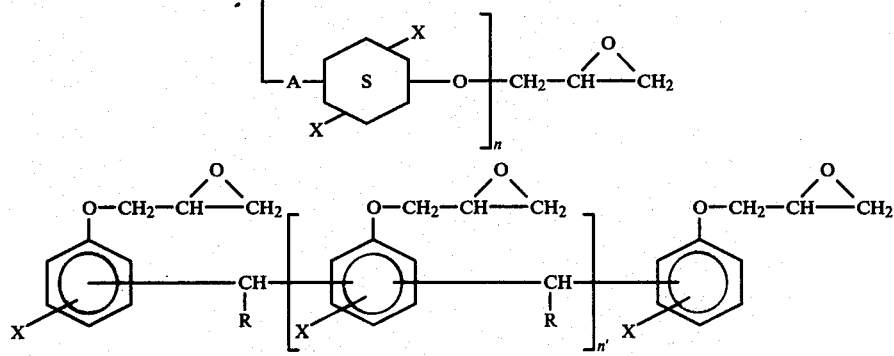

(III)

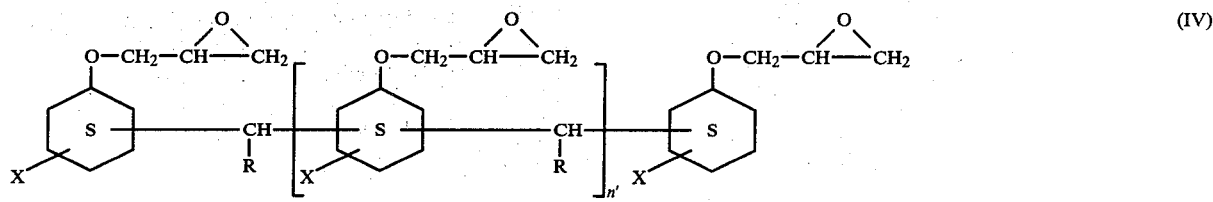

wherein A is a divalent hydrocarbon group having from about 1 to about 6 carbon atoms,

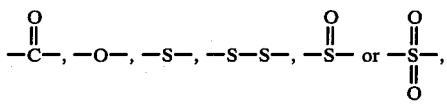

each X is independently hydrogen, chlorine or bromine, each R is hydrogen or an alkyl group having from about 1 to about 4 carbon atoms, n has an average value of from about 0 to about 0.6, preferably from about 0 to about 0.2, and each n' has an average value of from about 0.01 to about 0.6, preferably from about 0.05 to about 0.2.

Suitable compounds having only two amine hydrogen atoms which can be employed herein include, for example, ethanolamine, propanolamine, methylamine, ethylamine, propylamine, butylamine, aniline, furfurylamine, piperazine, mixtures thereof and the like.

Suitable compounds having only one amine hydrogen atoms which can be employed herein include, for example, diethanolamine, dipropanolamine, diethylamine, dipropylamine, dibutylamine, mixtures thereof and the like.

Suitable solvents which may be employed herein include the oxygenated solvents such as the glycol ethers such as ethylene glycol, methyl ether; ethylene glycol, butyl ether; ethylene glycol, ethyl ether; diethylene glycol, ethyl ether; diethylene glycol, n-butyl ether; diethylene glycol, ethyl ether; propylene glycol, methyl ether; dipropylene glycol, methyl ether; mixtures thereof and the like and in admixture with aromatic solvents such as, for example, xylene, toluene, ethylbenzene and the like.

The particular quantity of solvent employed is not critical although sufficient solvent should be employed during the preparation of the resin so as to permit sufficient agitation at low energy levels. Also, sufficient solvent should later be employed so as to permit suitable application viscosities of the coatings.

Suitable electrically conductive pigments which can be employed herein include, for example, aluminum, copper, cadmium, steel, carbon, zinc, magnetite, i.e., the magnetic oxide of iron, mixtures thereof and the like such as, for example a mixture of aluminum flake and zinc powder. Generally, the carbon pigments, e.g., channel blacks or furnace blacks, are the most finely divided of these electrically conductive pigments, often having particle size of 0.01 micron for the intensely black pigments. Comparatively, the finely divided aluminum powders have flake thickness for the finest grades of about 0.25 micron. These aluminum pigments can be typically produced by stamping, generally of small pieces of aluminum foil, or by ball milling atomized aluminum formed by air blasting a molten aluminum spray. Typically a finely divided zinc pigment is a distilled zinc dust or particles prepared by atomizing molten zinc in an air stream. Particle size for distilled zinc powders often average from about 2 to about 6 microns with generally about 99 weight percent or better passing a 240 mesh U.S. Standard Sieve.

Since these coatings generally are applied preparatory to subsequent welding of the substrate, they must contain a substantial amount of the electroconductive pigment, e.g., at least about 30 volume percent pigment and often more than about 65 percent by volume of particulate pigment, but on a weight basis, because of the density of the pigment, these coatings can contain up to about 90 weight percent of such pigment.

In some instances, it may be desirable to employ additives to the compositions of the present invention such as, for example, wetting agents, flow control agents, thixotropic agents, antisettling agents, moisture absorbents or scavengers and the like.

The following examples are illustrative of the present invention and are not to be construed as limiting the scope thereof in any manner.

A series of experiments were conducted wherein an amine compound and an initial 145.3 gram quantity of 2-ethoxyethanol solvent were heated in a one liter glass flask equipped with stirrer, temperature control and indicator means, and reflux condenser to 100° C. under an atmosphere of nitrogen. Then a diglycidyl ether of bisphenol A having an epoxide equivalent weight of 183 was slowly added over a period of thirty minutes. After completion of the epoxy resin addition the contents were heated for 3 hours at 130° C. In some of the experiments, additional quantities of 2-ethoxyethanol solvent were added to reduce the viscosity so as to facilitate easier stirring. After the three hours, an additional quantity of 2-ethoxyethanol solvent was added so as to bring the concentration of the reaction product to 32% resinous reaction product and 68% solvent.

The amine compounds quantities and results are given in the following Table.

Coatings were prepared by adding zinc dust (2 to 4 micron average particle size) in a sufficient quantity to provide 85% zinc by weight based upon the combined weight of zinc and resinous product and an additional quantity of 2-ethoxyethanol solvent was added to provide a composition containing 20% non-volatiles (resin+zinc) by weight. The coating was prepared by mixing in a high shear mixer for about 10 minutes.

The coatings were then applied to panels by means of an 18 gauge Meyer wound wire rod and baked in an oven at 200° to 300° C. for 1½ to 10 minutes. Typical dry film thicknesses were 0.25 to 0.5 mils (0.000635 cm to 0.00127 cm).

The panels were then subjected to a draw test.

The panels employed were cleaned cold rolled steel having dimensions of 0.025"×4"×12" (0.064 cm×10.16 cm×30.48 cm).

TABLE I

|  | Ex. 1 | Ex. 2 | Ex. 3 | Ex. 4 | Ex. 5 | Ex. 6 | Ex. 7 | Ex. 8 |
|---|---|---|---|---|---|---|---|---|
| Epoxy Resin, equiv. | 0.97 | 1.03 | 1.03 | 1.02 | 1.02 | 1.1 | 1.03 | 1.03 |
| Amine |  |  |  |  |  |  |  |  |
| Type/equiv.[4] | A[7]/1.0 | A/1.0 | A/1.0 | A/1.0 | A/0.985 B[8]/0.015 | A/1.0 | C[9]/1.0 | D[10]1.0 |
| Solvent Concentration,[1] % | 30[6] | 20 | 40 | 40 | 40 | 30 | 30 | 30[11] |
| Residual Epoxide, % | 0 | 0.22 | 0.19 | 0.03 | 0.04 | N.D. | N.D. | N.D. |
| Viscosity[2] at 32% N.V. | $Z_1$-$Z_2$ | $Z_6$ | $Z_6$ | $Z_6$-$Z_7$ | $Z_1$-$Z_2$ | $Z_7$ | $Z_5$-$Z_6$ | U-V |
| Average Mol. Weight[5] |  |  |  |  |  |  |  |  |
| Weight | 5,605 | 9,624 | 8,804 | 7,775 | 8,369 | 6,055 | 31,266 | 4,123 |
| Number | 2,024 | 1,707 | 2,958 | 2,791 | 2,983 | 1,870 | 7,842 | 1,088 |
| Draw Test[3] |  |  |  |  |  |  |  |  |
| 1st pass, % Retained | 100 | 100 | 100 | 100 | 100 | 100 | 95 | <50 |
| 2nd pass, % retained | 90 | 100 | 100 | 100 | 100 | 100 | 50 | <25 |

Footnotes to Table
[1] Concentration of solvent employed during reaction as percent based upon combined weight of reactants plus solvent.
[2] Gardner viscosity of resinous product measured at 25° C. at 32% resinous product and 68% solvent.
[3] Fisher Body Division of General Motors test method TM 47-18 dated 9/22/76, which is essentially described in U.S. Pat. 3,819,425, employing a die pressure of 2000 psi (140.6 kg/cm$^2$) and a speed of 2 in/min.(5.08 cm/min).
[4] Determined by titration with perchloric acid using crystal violet as an indicator.
[5] The average molecular weights were determined by gel permeation chromatography.
[6] The solvent employed was Solvesso 100 instead of 2-ethoxyethanol.
[7] Amine A was ethanolamine.
[8] Amine B was diethanolamine.
[9] Amine C was 1-amino-2-propanol.
[10] Amine D was aniline.
[11] The solvent employed was dipropylene glycol, methyl ether instead of 2-ethoxyethanol.

COMPARATIVE EXPERIMENT

For comparative purposes, a panel was coated as in the previous examples employing a high molecular weight epoxy resin having a weight average molecular weight of 49.288 as a 32% solution in 2-ethoxyethanol. The thus coated panel was cured as in the previous examples and subjected to the double draw test. The results were as follows:

1st pass, % retained 25
2nd pass, % retained 0.

I claim:

1. In a weldable coating composition comprising an electrically conductive pigment, an epoxy resin binder and solvent, the improvement which comprises employing as the epoxy resin binder, the reaction product of
  (1) an epoxy resin having an average of more than one but less than three vicinal epoxy groups per molecule which is a polyclycidyl ether of a polyhydroxyl-containing compound or mixture of such epoxy resins wherein said epoxy resins have an epoxide equivalent weight of less than about 250 and that when said epoxy resin contains aromatic or cycloaliphatic groups substituted with halogen atoms said equivalent weight is calculated on the basis of the halogen atoms being hydrogen atoms; with
  (2) (a) from about 90 to about 100 equivalent percent of a compound having only two amine hydrogen atoms and
    (b) from about 0 to about 10 equivalent percent of a compound having only one amine hydrogen;
  and wherein the epoxy:amine hydrogen equivalent ratio is from about 0.90:1 to about 1.1:1.

2. The composition of claim 1 wherein the epoxy resin of component (1) has an epoxide equivalent weight of less than about 200 and component (2a) is present in quantities of from about 95 to about 100 equivalent percent and component (2b) is present in quantities of from 0 to about 5 equivalent percent.

3. The composition of claim 2 wherein the epoxy:amine hydrogen equivalent ratio is from about 0.95:1 to about 1.03:1.

4. The composition of claim 3 wherein the epoxy resin is a diglycidyl ether of bisphenol A and the amine is ethanolamine.

5. The composition of claim 1, 2, 3, or 4 wherein the electrically conductive pigment is zinc.

* * * * *